(12) United States Patent
Rosenfled (10) Patent No.: US 7,440,403 B2
(45) Date of Patent: Oct. 21, 2008

(54) METHOD AND SOFTWARE FOR CALCULATING RATE CONSTRAINTS

(75) Inventor: Amir Rosenfled, Raanana (IL)

(73) Assignee: P-Cube Ltd., Herzliya (IL)

( * ) Notice: Subject to any disclaimer, the term of this patent is extended or adjusted under 35 U.S.C. 154(b) by 1141 days.

(21) Appl. No.: 10/267,735

(22) Filed: Oct. 10, 2002

(65) Prior Publication Data

US 2004/0071081 A1 Apr. 15, 2004

(51) Int. Cl.
*H04L 12/56* (2006.01)
(52) U.S. Cl. ................... 370/235; 370/395.41; 370/418
(58) Field of Classification Search ............... 370/230, 370/232, 237, 389, 233, 235, 229, 235.1, 370/468, 450, 463, 395.41, 417, 418; 709/238, 709/232
See application file for complete search history.

(56) References Cited

U.S. PATENT DOCUMENTS

| | | | | |
|---|---|---|---|---|
| 5,339,332 A | | 8/1994 | Kammerl | 370/13 |
| 5,625,622 A | | 4/1997 | Johri | 370/232 |
| 5,991,812 A | * | 11/1999 | Srinivasan | 709/232 |
| 6,047,000 A | * | 4/2000 | Tsang et al. | 370/412 |
| 6,118,791 A | * | 9/2000 | Fichou et al. | 370/468 |
| 6,167,027 A | * | 12/2000 | Aubert et al. | 370/230 |
| 6,198,750 B1 | * | 3/2001 | Buchholz et al. | 370/395.42 |
| 6,247,061 B1 | | 6/2001 | Douceur et al. | 709/240 |
| 6,286,052 B1 | * | 9/2001 | McCloghrie et al. | 709/238 |
| 6,349,088 B1 | | 2/2002 | Ginzboorg et al. | 370/230 |
| 6,434,160 B1 | * | 8/2002 | Davis | 370/412 |
| 6,470,016 B1 | * | 10/2002 | Kalkunte et al. | 370/395.41 |
| 2003/0007494 A1 | * | 1/2003 | Shahar et al. | 370/395.41 |

* cited by examiner

*Primary Examiner*—Wing F. Chan
*Assistant Examiner*—Brian Roberts
(74) *Attorney, Agent, or Firm*—Abelman, Frayne & Schwab (57) ABSTRACT

A method for determining and enforcing rate constraints on process flows in a network, the method comprising receiving at least one process flow. A flow rate vulnerability (FRV) factor and a required bandwidth (RBW) parameter are determined for the at least one process flow. A rate constraint is calculated for the at least one process flow and the rate constraint is enforced on the at least one process flow.

21 Claims, 6 Drawing Sheets

Arriving Packets

METHOD AND SOFTWARE FOR CALCULATING RATE CONSTRAINTS

FIELD

The present disclosure generally teaches traffic management and traffic shaping in packet-based communications networks. More particularly it teaches techniques for limiting the traffic rate in such networks.

BACKGROUND

1. References

The following U.S. patents and papers provide useful background information, for which they are incorporated herein by reference in their entirety.

a) Patents

| | | |
|---|---|---|
| 6,349,088 | Febuary 2002 | Ginzboorg, et al. |
| 6,286,052 | September 2001 | McCloghrie, et al. |
| 6,247,061 | June 2001 | Douceur, et al. |
| 6,167,027 | December 2000 | Aubert, et al. |
| 6,118,791 | September 2000 | Fichou, et al. |
| 5,625,622 | April 1997 | Johri |
| 5,339,332 | August 1994 | Kammerl |

2. Introduction

Presently, networks that use Internet Protocol (IP) have physical properties that allow traffic transmission rates that are beyond the needs of the users of the network. As a result, either users pay for bandwidth and end up using only a fraction of the bandwidth that they paid for, or they take advantage of excess bandwidth and use bandwidth at rates beyond what they actually paid for. To overcome this and to charge users only for bandwidth rate that they actually utilize, Internet service providers (ISPs) limit the transmission rate by manipulating the physical connection capabilities.

Networks using IP usually communicate using transmission control protocol (TCP) or user datagram protocol (UDP). These protocols do not provide mechanisms for controlling the rate of individual flows. Therefore, in order to control the aggregate rate of individual flows, a method to perform asynchronous centralized control of non-cooperative process flows is required. Data packets are classified into process flows, or flows, based on an analysis of various characteristics of the data packet and/or the data contained in the packet header. For example, if the data packet contains a packet header, the packet may be classified as a first type of data packet if the source IP address falls within a first range of source IP addresses, the destination IP address falls within a first range of destination IP addresses, the protocol data falls within a first range of protocol data values, the source port data falls within a first range of source port data values, and the destination port data falls within a first range of destination port data values. Similarly the data packet may be classified as belonging to a second flow if the source IP address falls within a second range of source IP addresses. Non-cooperative process flows are unrelated flows.

Figure 1A:
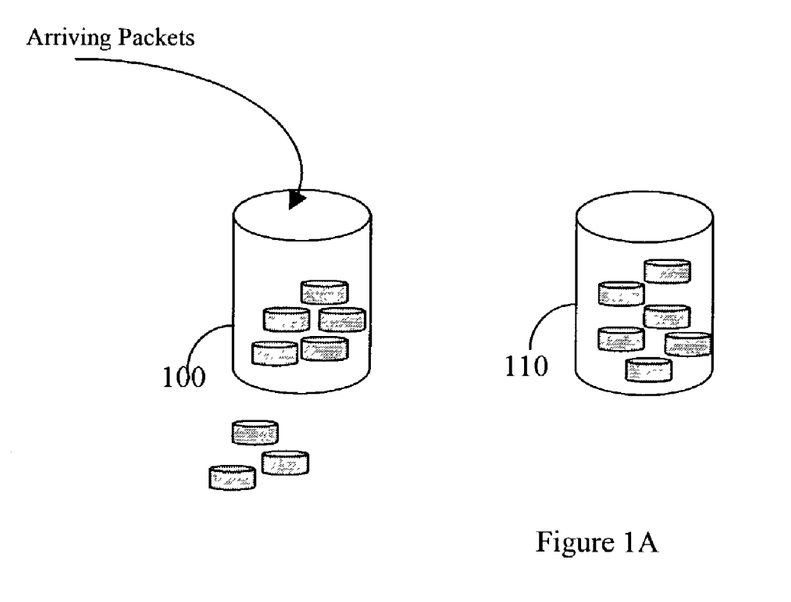
FIG. 1A-C show illustrations related to a conventional TCM algorithm.
Figure 1B:
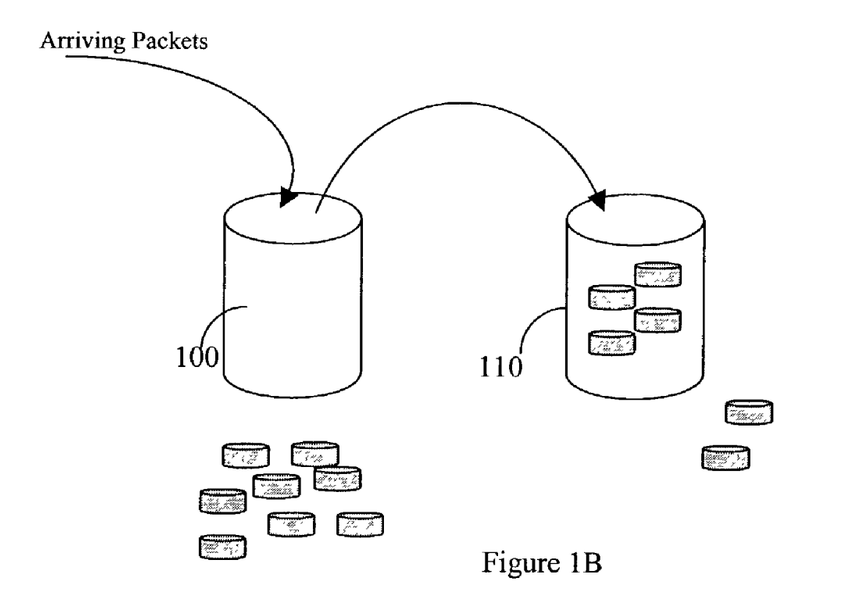
Figure 1C:
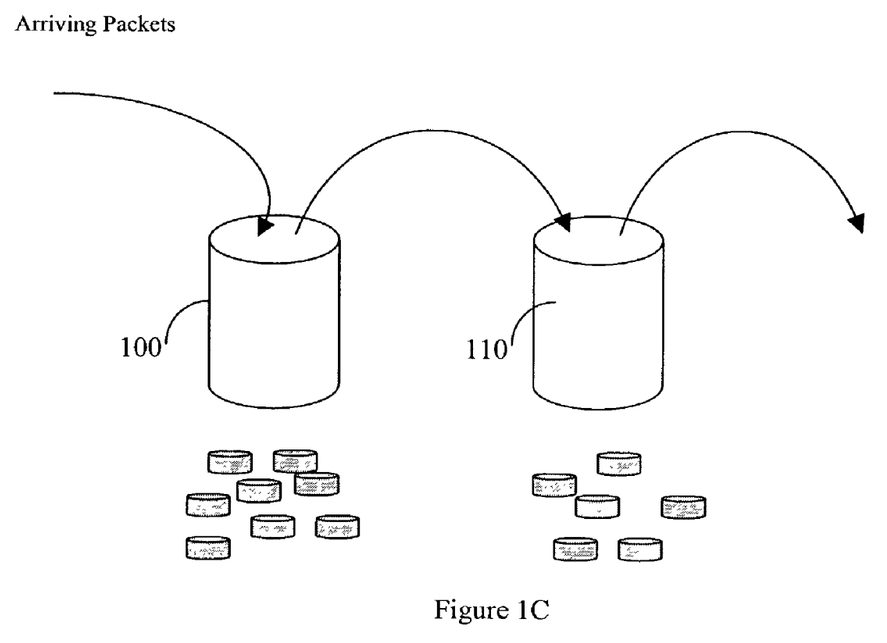

A conventional method used to perform asynchronous centralized control of non-cooperative flows is the two-buckets-three-colors or single rate three color marker (TCM) algorithm. Reference is now made to FIG. 1A, which illustrates the operation of the TCM algorithm. TCM uses two buckets 100 and 110. Packets inserted into bucket 100 are considered to be colored in green, while packets inserted into bucket 110 are considered to be colored in yellow. Packets that are not inserted into either bucket 100 or bucket 110 are considered to be colored in red. Buckets 100 and 110 usually contain a different number of tokens. The number of tokens in bucket 100 is equal to the committed burst size (CBS) (or commit rate), while the number of tokens in bucket 110 is equal to the excess burst size (EBS) (or excess rate). The tokens for buckets 100 and 110 are generated at a combined rate called committed information rate (CIR). Tokens are added to bucket 110 when bucket 100 is full. An arriving packet is inserted into bucket 100, if the number of tokens in bucket 100 is greater than the number of tokens necessary for the arriving packet. If the arriving packet was inserted into bucket 100, the algorithm drops tokens from bucket 100. The number of dropped tokens is equal to the number of tokens consumed by the packet. As illustrated in FIG. 1B, in case of overflow, i.e., all the tokens in bucket 100 have been used, the packet is forwarded to bucket 110. As illustrated in FIG. 1C, if there is an overflow from bucket 110 as well as from bucket 100, the packet is considered to be colored in red. Green packets are transmitted at a rate equal to the CBS, yellow packets are transmitted at a rate equal to the EBS, and red packets are not transmitted.

Different algorithms based on the principle described in the TCM algorithm may be found in discussions relating to conventional techniques. For example, leaky bucket, adaptive leaky bucket, one bucket two colors, are just a few of the conventional techniques.

TCM and other algorithms generally do not share the rate evenly between different flows. The flow rate depends on factors that are outside the control of the algorithm, and therefore the outcome is not necessarily desirable. Another major disadvantage of these conventional algorithms is the fact that they cannot discern the flow rates according to flow types. For example, if the TCM algorithm accepts both a voice over IP (VoIP) flow and a file transport protocol (FTP) flow, both packets would be handled identically. Because FTP over TCP is greedy it will consume more bandwidth. This will affect VoIP flow transmission. However, it would be more desirable to give the VoIP flow its requested flow rate since it is sensitive to rate disturbances, and give the FTP whatever bandwidth that remains. But, the conventional TCM algorithm does not provide for such an allocation of bandwidth.

Therefore, it would be advantageous to have a method that dynamically applies fair rate constraints to different flows according to the flows' types and the flows' real-time bandwidth demands.

SUMMARY

To realize the advantages discussed above, the disclosed teachings provide a method for determining and enforcing rate constraints on process flows in a network, the method comprising receiving at least one process flow. A flow rate vulnerability (FRV) factor and a required bandwidth (RBW) parameter are determined for said at least one process flow. A rate constraint is calculated for said at least one process flow and the rate constraint is enforced on said at least one process flow.

In another specific enhancement, said FRV factor is a parameter that determines a vulnerability of the process flow to an induced reduction in a flow rate allocated for the process flow.

In another specific enhancement, the FRV factor is allocated a low value when the process flow is more adaptive to reduction in bandwidth.

More specifically, the FRV factor is allocated a high value when the process flow is less adaptive to reduction in bandwidth.

In another specific enhancement, the FRV factor is determined according to a type of the process flow.

More specifically, the type of the process flow is one of sensitive flow and robust flow.

Even more specifically, the FRV factor is determined in accordance with a priority assigned to the type of process flow.

In another specific enhancement, the rate constraint is calculated using a process comprising determining a bandwidth reduction unit for said at least one process flow, determining a total required bandwidth by summing the values of said RBW parameters associated with each of the process flows, determining a total bandwidth reduction unit by summing the value of bandwidth reduction units associated with each of the process flows, determining a reduction (RD) factor using the total required bandwidth and the total bandwidth reduction unit and determining the rate constraint for each of said process flows using a required rate associated with each of said process flows and the RD factor.

Even more specifically, the FRV factor is stored in a first array.

Even more specifically, the first array is one of a two-dimensional array and a double linked list.

Even more specifically the bandwidth reduction unit is stored in a second array.

Even more specifically, the second array is one of an one-dimensional array, a linked list and a vector.

Even more specifically, the bandwidth reduction unit is determined as a ratio between the RBW parameter and the FRV factor.

Even more specifically, determining said total required bandwidth further comprises obtaining values of said RBW parameters form the first array.

Even more specifically, determining said total bandwidth reduction unit further comprises obtaining values of the bandwidth reduction units from the second array.

Even more specifically, the RD factor is computed using a sub-process comprising finding a difference between said total required bandwidth and the total available bandwidth; and obtaining the ratio between the result and the total bandwidth reduction unit.

Even more specifically, the rate constraint of said process flow is computed using a sub-process comprising obtaining a first product of the RD factor the bandwidth reduction unit associated with the process flow; and obtaining a difference between the RBW associated with the process flow and the first product.

Even more specifically, determining said total bandwidth reduction units further comprises obtaining the values of said bandwidth reduction units from said second array.

In another specific enhancement, the rate constraint is computed using a sub-process comprising initializing a first index variable and a second index variable to one. A total bandwidth reduction unit variable and a total required bandwidth variable are both initialized to zero. A result of a division between the RBW parameter and the FRV factor is added to the total bandwidth reduction unit variable, wherein the RBW parameter and the FRV factor are both associated with a process flow corresponding to said first index variable. Value of the RBW parameter is added to said total required bandwidth variable, wherein the RBW parameter is associated with the process flow corresponding to said first index variable. Checking is performed to determine if said first index variable is equal to a total number of said process flows. If no, then the said first index variable is increased by one; and the steps are repeated. If yes, then the reduction (RD) factor is calculated, said RD factor representing a number of bandwidth reduction units that will reduce from each of said process flows. A rate constraint associated with the process flow corresponding to the second index variable based on the RD factor is calculated. Checking is performed to determine if said second index variable is equal to the total number of said process flows. If yes then the process is stopped. I no in step x, then said second index variable is increased by one; and, the relevant steps are repeated.

Even more specifically, the RD factor is computed by finding a difference between value of said total required bandwidth variable and a total available bandwidth and obtaining the ratio between the difference and the total bandwidth reduction units variable.

Even more specifically, the rate constraint is determined by obtaining a second product of the RD factor and the quotient of the RBW parameter and the FRV factor corresponding the process flow associated with the second index variable and obtaining subtracting the second product from RBW parameter corresponding to the process flow associated with the second index variable.

In another specific enhancement, ]the rate constraint is enforced using a flow rate enforcement (FRE) object.

Even more specifically, the FRE object implements at least one of the following strategies: single rate three color market, leaky bucket, adaptive leaky bucket, one bucket two colors.

Another aspect of the disclosed teachings is a computer program product including computer-readable media, said media comprising instructions for enabling a computer to execute procedures, according to the above methods, for determining and enforcing rate constraints on process flows in a network.

Another aspect of the disclosed teachings is a rate constraint enforcing system, for classifying packets in a network and enforcing a rate constraint on a process flow in a network, comprising a packet classifier for classifying and identifying at least one flow type; and, a rate constraint enforcer for determining and enforcing rate constraints on said at least one flow type.

In another specific enhancement, said rate constraint enforcer comprises a flow meter support (FMS) object, a flow rate enforcer (FRE) object, and a flow manager.

More specifically, said FRE implements at least one of the following strategies: single rate three color market, leaky bucket, adaptive leaky bucket, one bucket two colors.

In another specific enhancement, the FMS is capable of receiving at least one process flow, the FMS is capable of determining a flow rate vulnerability (FRV) factor and a required bandwidth (RBW) parameter for-said at least one process flows and the flow manager is capable of calculating the rate constraints for each of said at least one process flows.

In another specific enhancement, said FRV factor is a parameter that determines a vulnerability of the process flow to an induced reduction in a flow rate allocated for the process flow.

More specifically, the FRV factor is allocated a low value when the process flow is more adaptive to reduction in bandwidth.

Even more specifically, the FRV factor is allocated a high value when the process flow is less adaptive to reduction in bandwidth.

More specifically, the FRV factor is determined according to a type of the process flow.

Even more specifically, the type of the process flow is one of sensitive flow and robust flow.

BRIEF DESCRIPTION OF THE DRAWINGS

The above objectives and advantages of the disclosed teachings will become more apparent by describing in detail preferred embodiment thereof with reference to the attached drawings in which.

DETAILED DESCRIPTION

The disclosed techniques provide a technique for calculating rate constraints in networks where a rate limitation is to be enforced. These constraints are imposed on a set of flows that do not have pre-allocated bandwidth. The techniques provided determine individual rate constraints on the flows, so that the aggregate total rate of the flows does not exceed the total allocated bandwidth. The technique computes the rate penalty that is to be imposed on each of the flows. The penalty is proportional to the flow type and the rate required by the flow. The vulnerability of a flow to any reduction in the bandwidth depends on the type of flow. Further, each flow has a different vulnerability to bandwidth reduction, which needs to be taken into consideration.

Figure 2:
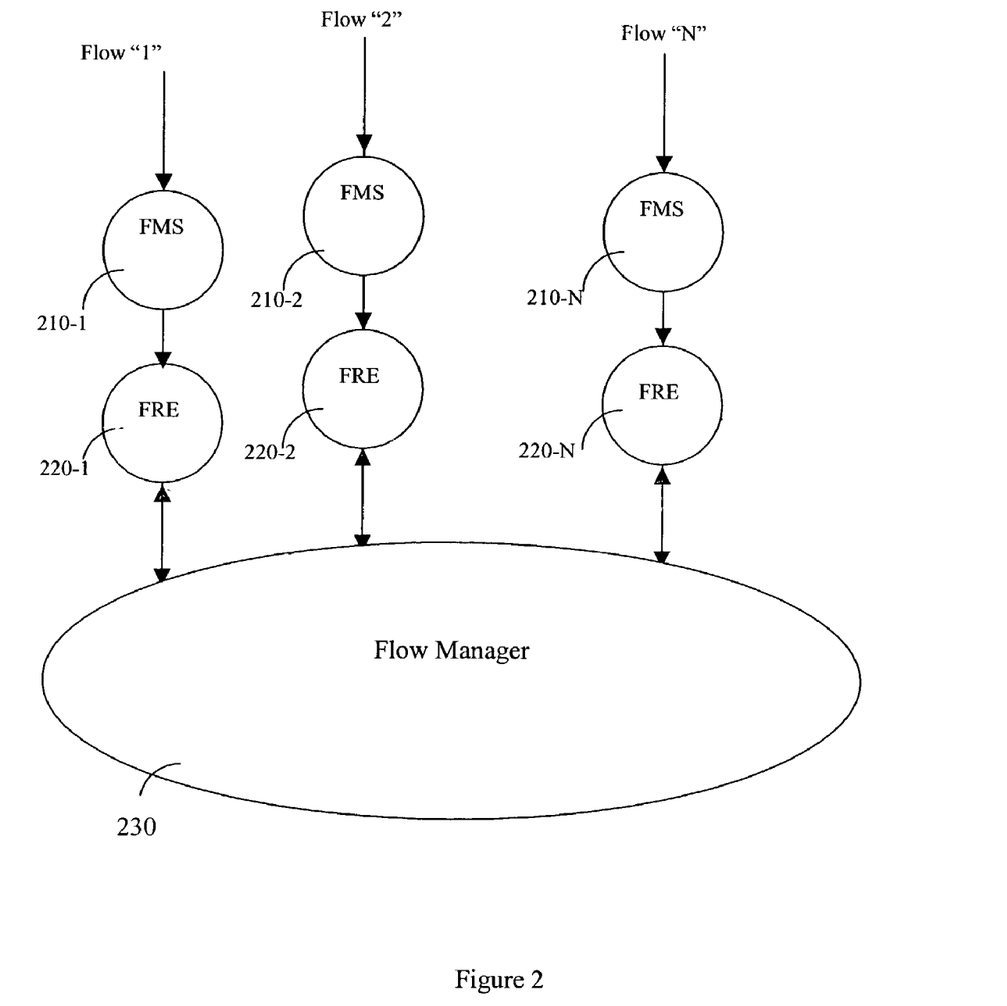
FIG. 2 is a schematic diagram describing the functionality of the method for calculating rate constraints.

Reference is now made to FIG. 2 where an exemplary functional diagram of the method for calculating the rate constraints is shown. "N" flows are shown, each having a flow meter support (FMS) 210 1-N and a flow rate enforcer (FRE) 220. FMS 210 is an object that maintains the parameters that are needed for the interaction with flow manager 230. These parameters include the required flow rate and the flow rate vulnerability (FRV) factor. The FRV factor quantitatively represents the vulnerability of an flow to a reduction in the availability of bandwidth. Such limitations of bandwidth can be considered to be limitations on the transmission rate. A low value of FRV factor means that it is easier to reduce the flow's transmission rate. For example, a flow categorized as a robust flow (such as a file transport protocol (FTP) flow or HTTP flow) may have a low FRV factor. On the other hand, a flow categorized as a sensitive flow (such as a voice over IP (VoIP) or video transmission) may have a high FRV factor. FRE 220 1-N sets the maximum rate for each flow. Each flow has a single FRE 220. FRE 220 1-N may be implemented by any of several conventional means including, but not limited to, TCM, leaky bucket, adaptive leaky bucket, one bucket two colors, and so on. Flow manager 230 receives from each FMS 210 1-N the required rate and the FRV factor and based on this data calculates the rate constraint that is to be enforced on each flow. The algorithm used for calculating the rate constraint is described below in more details. After calculating the rate constraint, flow manager 230 reports to each FRE 220 1-N the rate to be enforced.

Figure 3:
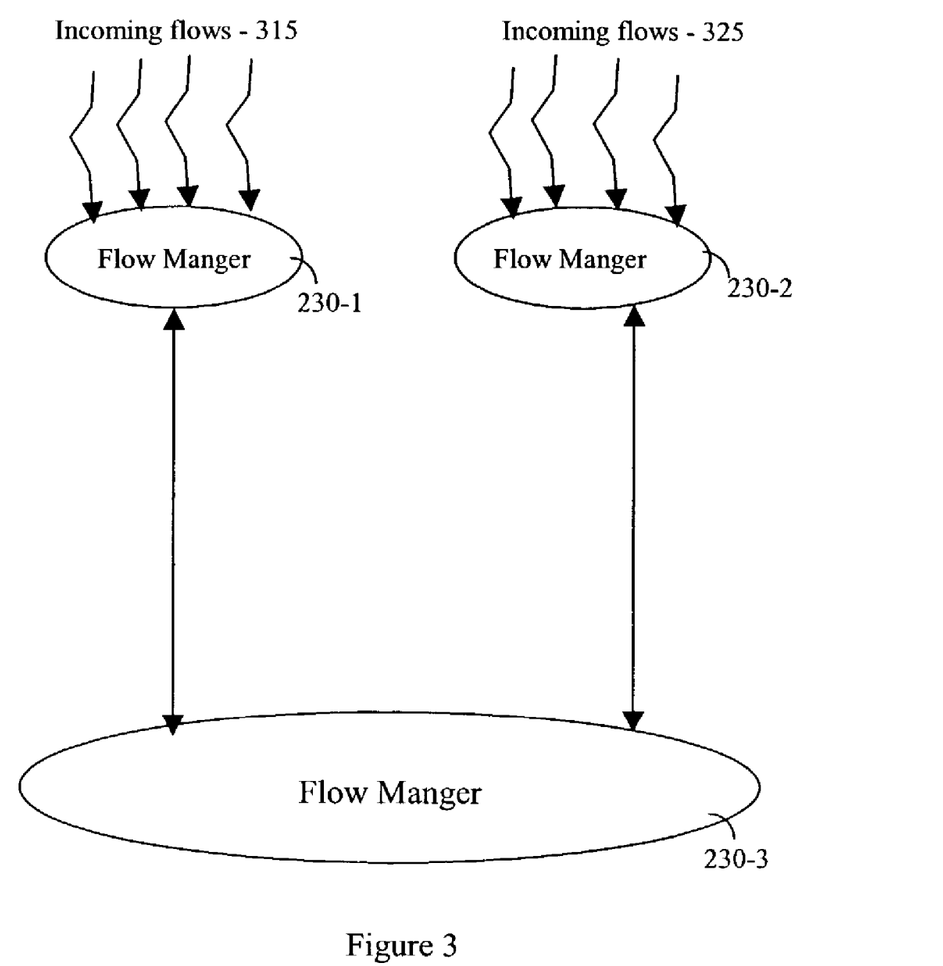
FIG. 3 is a schematic diagram showing flow managers hierarchically connected to each other.

In an alternate implementation of the invention, the technique for calculating rate constraint may include handling a plurality of flow managers 230 1-3, hierarchically connected to each other. As illustrated in FIG. 3, two flow managers 230-1 and 230-2 are connected to flow manager 230-3. Flow mangers 230-1 and 230-2 provide flow manger 230-3 with the required rate of flows 315 and 325. Flow manger 230-3 provides flow manger 230-1 and 230-2 with the total rate to be enforced on flows 315 and 325. Such structuring provides the ability to set a different priority to each of the flow managers 230-1 and 230-2. Flow manager 230-3 allocates bandwidth to flows 315 and 325, according to the priorities associated with flow managers 230-1 and 230-2. For example if flow manager 230-1 has a higher priority compared to flow manager 230-2, then flows 315 will acquire more bandwidth than flows 325. It should be noted that the hierarchical structure illustrated in FIG. 3 may include an unlimited number of flow managers 230 hierarchically connected to each other.

Figure 4:
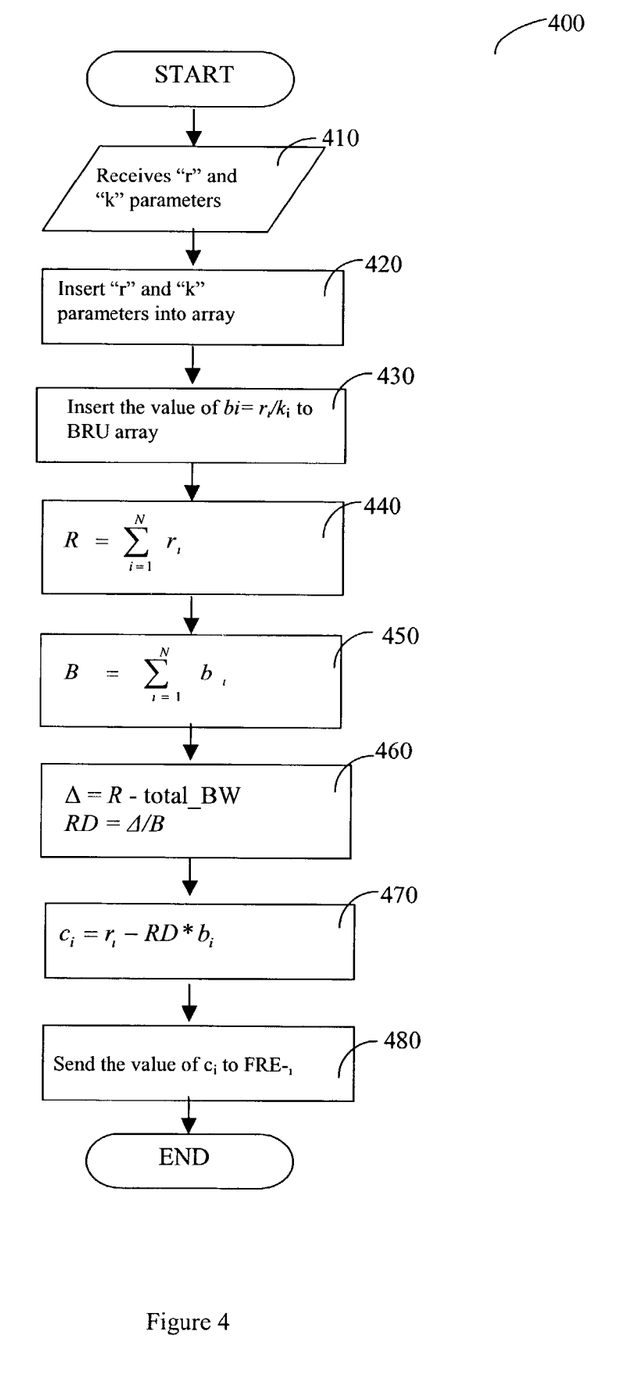
FIG. 4 is an exemplary embodiment of the algorithm for calculating the rate constraint according to the disclosed techniques.

Reference is now made to FIG. 4 where an exemplary implementation of an algorithm 400 used for calculating the rate constraint according to the disclosed techniques is shown. In step 410, flow manager 230 receives the required rate (hereinafter "r") and the FRV factor (hereinafter "k") from each of the FMS 210 1-N objects. In step 420 flow manger 230 inserts the received parameters into a parameter array. Parameter array is part of flow manger 230 and may be a two dimensional array. In an alternate implementation, each $r_1$ and $k_1$ may be kept in FMS-i. In step 430, for each flow "i", flow manager 230 calculates the flow bandwidth reduction unit (hereinafter "b"), which is the ratio between $r_1$ and $k_1$. The results are inserted into bandwidth reduction units (BRU) array. The BRU array also forms part of the flow manger 230. In step 440, flow manager 230 calculates the sum of the bandwidth requirements of the flows (hereinafter "R"). "R" is determined by obtaining the values of $r_i$ from the parameters array and summing up theses values. In step 450, flow manger 430 calculates the sum of the bandwidth reduction units of the flows (hereinafter "B"). "B" is determined by obtaining the values of $b_1$ from BRU array and summing up these values. In steps 410 through 450 "i" is an index variable that begins at one and ends at N, wherein "N" represents the number of flows. In step 460 flow manager 230 determines two additional parameters: the difference (Δ) between "R" and the total available bandwidth, and the reduction factor (RD). The RD factor represents the number of bandwidth reduction units that is to be reduced from each the bandwidth allocated to each flow. The value of RD factor is provided by the equation:

$$RD = \Delta/B.$$

In step 470, flow manager 230 uses the parameters calculated in the previous steps in order to calculate the rate constraint (hereinafter "c") to be imposed on each flow. The value of c is calculated for each of the incoming flows using the equation:

$$c_i = r_i - RD * b_i$$

The values of $r_i$ and $b_1$ are taken from the parameters array and the BRU array respectively. The sum of $c_i$ is equal to the total available bandwidth. In step 480, the flow manager reports to each FRE 210-i the value of $c_i$. FRE 210-i sets the maximum allowed rate according to the value of $c_i$.

It should be noted that the parameter array and the BRU array are optional storage means and a person skilled in the art can easily use other implementations of algorithm 300.

The following is a non-limiting example of two flows having the following parameters: $r_1$=100Kbps, $k_1$=1; $r_2$=100Kbps, $k_2$=5; and the available bandwidth is equals 140Kbps, where Kbps is kilobits per second. In step 420, flow manager 230 computes the flow bandwidth reduction unit (b), which equals to b=r/k. Hence $b_1$=100/1=100Kbps and $b_2$=100/5=20Kbps. In step 430, the values of R and B are calculated. These values are equal to B=100+20=120Kbps and R=100+100=200Kbps. In step 440, the values of $\Delta$ and RD are calculated. The value of $\Delta$ equals to R minus the total available bandwidth, i.e., 200−140=60Kbps. The value of RD is equal to $\Delta/B=60/120=0.5$. In step 450, flow manager 230 calculates the rate constraints $c_1$ and $c_2$. The calculation results in:

$$c_1=r_1-RD*b_1=100-0.5*100=50 \text{ Kbps; and,}$$

$$c_2=r_2-RD*b_2=100-0.5*20=90 \text{ Kbps.}$$

It can be noticed that the sum of $c_1$ and $c_2$ is equal to the total available bandwidth. Furthermore, the flow with the greater FVR factor receives more bandwidth.

Figure 5:
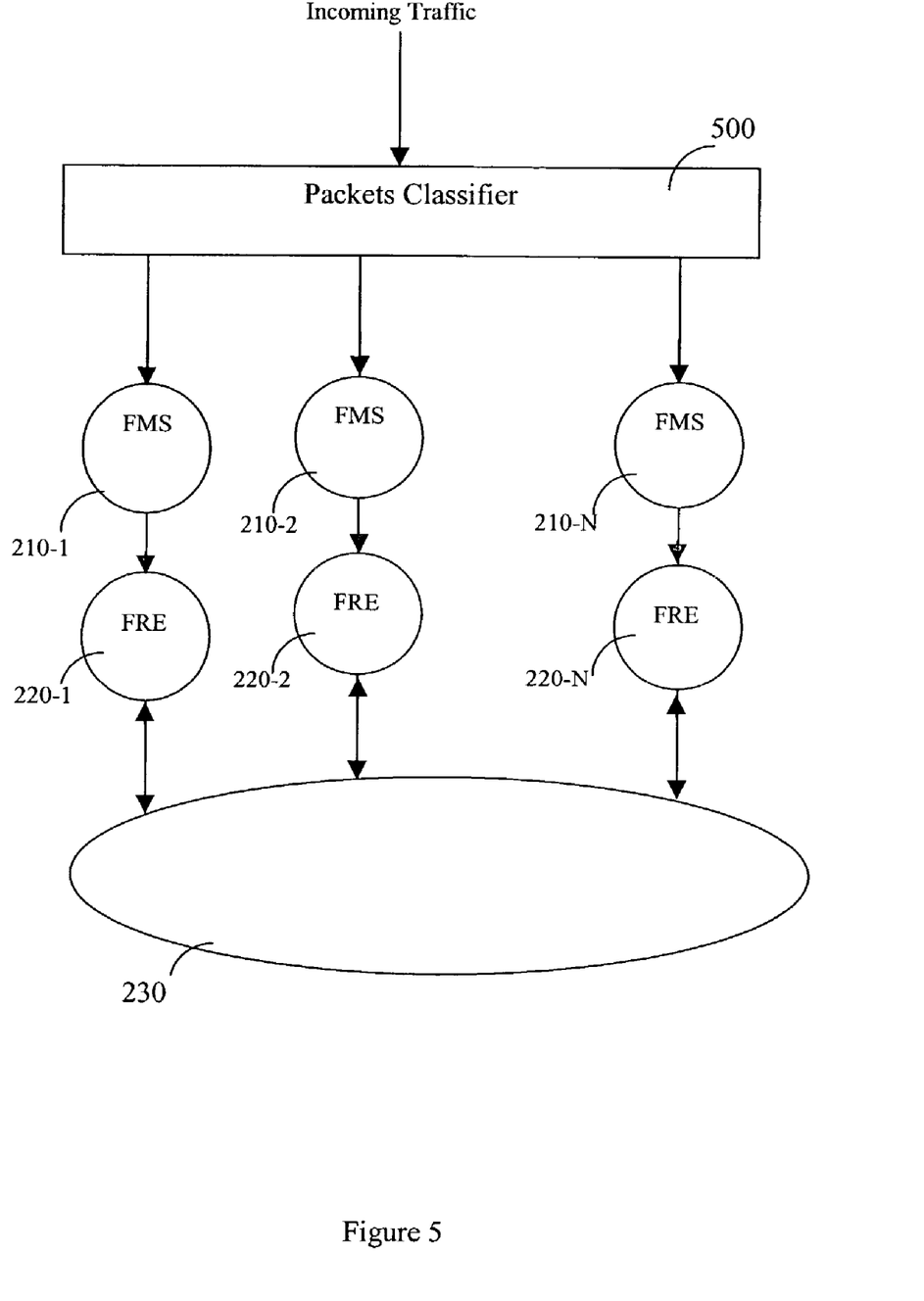
FIG. 5 is a schematic of a packets classifier capable of embodying the disclosed techniques.

Reference is now made to FIG. 5, where a packet classifier 500 is shown. A detailed description of a packet classifier is included in U.S. patent application Ser. No. 09/547,034, entitled "Apparatus, Method, and Software For Analyzing Network Traffic In A Service Aware Network", which is assigned to the same common assignee as the present application, and is hereby incorporated herein by reference in its entirety, for all it discloses. As can be understood from the description of algorithm 400, it is fundamental to recognize the type of an incoming flow in order to set the FRV factor according to the flows type, if one is to calculate the rate constraint correctly. The ability to recognize the type of flow is provided by classifier 500. Classifier 500 is capable of classifying packets as they flow through the network system, correlating them with previously received packets, and identifying them uniquely. This ensures that the packets are handled in an efficient manner once they are processed by packet processors. It is further important that a process flows related to another process flow having a high priority should likely enjoy the same level of priority in order to maintain the necessary performance. Once classifier 500 recognizes a new flow, it identifies its type and activates a new FMS 210 object. FMS 210 determines the FRV factor and the required bandwidth according to the flow type, and passes these parameters to flow manager 230. Furthermore, a related flow to the new flow will also be identified as belonging to the mentioned new flow. Flow manager 230, after receiving the FRV factor and the required bandwidth from FMSs 210, calculates the rate constraint.

An aspect of the disclosed teachings is a computer program product including computer-readable media comprising instructions. The instructions are capable of enabling a computer to implement the techniques described above. It should be noted that the computer-readable media could be any media from which a computer can receive instructions, including but not limited to hard disks, RAMs, ROMs, CDs, magnetic tape, etc. Also instructions can be in any form including source code, object code, executable code, and in any language including higher level, assembly and machine languages. The computer system is not limited to any type of computer. It could be implemented in a stand-alone machine or implemented in a distributed fashion, including over the internet.

Other modifications and variations to the invention will be apparent to those skilled in the art from the foregoing disclosure and teachings. Thus, while only certain embodiments of the invention have been specifically described herein, it will be apparent that numerous modifications may be made thereto without departing from the spirit and scope of the invention.

What is claimed is:

1. A method for communication, comprising:

receiving at least first and second flows of packets in a network, belonging to different, respective first and second flow types and having respective first and second required bandwidths;

assigning different, respective first and second flow-rate vulnerability (FRV) factors to the first and second flows, responsively to the different, respective flow types;

upon determining that a total bandwidth available for transmission of the flows is less than a sum of the required bandwidths of the received flows, allocating first and second reduced bandwidths for transmission of the first and second flows, respectively, by reducing both of the first and second required bandwidths by different, respective amounts responsively to the first and second FRV factors; and transmitting the first and second flows at the first and second reduced bandwidths, respectively.

2. The method according to claim 1, wherein receiving the at least first and second flows comprises classifying the packets as they flow through the network so as to identify the flows as belonging to the first and second flow types.

3. The method according to claim 1, wherein assigning the different, respective first and second FRV factors comprises setting the first and second FRV factors responsively to respective sensitivities of the first and second flow types to bandwidth reduction.

4. The method according to claim 3, wherein the first flow type is relatively more sensitive than the second flow type to bandwidth reduction, and wherein the first and second FRV factors are set so that the first required bandwidth is reduced by a relatively smaller amount than the second required bandwidth.

5. The method according to claim 4, wherein the first flow type is selected from a first group of transmission types consisting of a voice transmission and a video transmission, and wherein the second flow type is selected from a second group of the transmission types consisting of a file transport transmission and a hypertext transport transmission.

6. The method according to claim 1, wherein allocating the first and second reduced bandwidths comprises computing, responsively to the first and second FRV factors, first and second rate constraints to be applied respectively to the first and second flows so that the sum of the reduced bandwidths is equal to the total available bandwidth.

7. The method according to claim 6, wherein computing the first and second rate constraints comprises reducing the first and second required bandwidths by a product of a reduction factor and respective first and second bandwidth reduction units, which are determined by the respective first and second FRV factors.

8. A computer program product comprising computer-readable media encoded with instructions that cause a computer to receive at least first and second flows of packets in a network, belonging to different, respective first and second flow types and having respective first and second required bandwidths, to assign different, respective first and second flow-rate vulnerability (FRV) factors to the first and second flows, responsively to the different, respective flow types, and upon determining that a total bandwidth available for transmission of the flows is less than a sum of the required bandwidths of the received flows, to allocate first and second reduced bandwidths for transmission of the first and second flows, respectively, by reducing both of the first and second required bandwidths by different, respective amounts responsively to the first and second FRV factors and to transmit the first and second flows at the first and second reduced bandwidths, respectively.

9. The product according to claim 8, wherein the instructions cause the computer to classify the packets as they flow through the network so as to identify the flows as belonging to the first and second flow types.

10. The product according to claim 8, wherein the instructions cause the computer to set the first and second FRV factors responsively to respective sensitivities of the first and second flow types to bandwidth reduction.

11. The product according to claim 10, wherein the first flow type is relatively more sensitive than the second flow type to bandwidth reduction, and wherein the first and second FRV factors are set so that the first required bandwidth is reduced by a relatively smaller amount than the second required bandwidth.

12. The product according to claim 11, wherein the first flow type is selected from a first group of transmission types consisting of a voice transmission and a video transmission, and wherein the second flow type is selected from a second group of the transmission types consisting of a file transport transmission and a hypertext transport transmission.

13. The product according to claim 8, wherein the instructions cause the computer to calculate, responsively to the first and second FRV factors, first and second rate constraints to be applied respectively to the first and second flows so that the sum of the reduced bandwidths is equal to the total available bandwidth.

14. The product according to claim 13, wherein the instructions cause the computer to reduce the first and second required bandwidths by a product of a reduction factor and respective first and second bandwidth reduction units, which are determined by the respective first and second FRV factors.

15. A system for communication, comprising:
a flow manager, which is coupled to receive at least first and second flows of packets in a network, belonging to different, respective first and second flow types and having respective first and second required bandwidths, wherein different, respective first and second flow-rate vulnerability (FRV) factors are assigned to the first and second flows, responsively to the different, respective flow types; and
a rate constraint enforcer, which is operative, upon determining that a total bandwidth available for transmission of the flows is less than a sum of the required bandwidths of the received flows, to allocate first and second reduced bandwidths for transmission of the first and second flows, respectively, by reducing both of the first and second required bandwidths by different, respective amounts responsively to the first and second FRV factors, so as to cause the flow manager to transmit the first and second flows at the first and second reduced bandwidths, respectively.

16. The system according to claim 15, and comprising a packet classifier, which is coupled to classify the packets as they flow through the network so as to identify the flows as belonging to the first and second flow types.

17. The system according to claim 15, wherein the first and second FRV factors are set responsively to respective sensitivities of the first and second flow types to bandwidth reduction.

18. The system according to claim 17, wherein the first flow type is relatively more sensitive than the second flow type to bandwidth reduction, and wherein the first and second FRV factors are set so that the first required bandwidth is reduced by a relatively smaller amount than the second required bandwidth.

19. The system according to claim 18, wherein the first flow type is selected from a first group of transmission types consisting of a voice transmission and a video transmission, and wherein the second flow type is selected from a second group of the transmission types consisting of a file transport transmission and a hypertext transport transmission.

20. The system according to claim 15, wherein the rate constraint enforcer is arranged to calculate, responsively to the first and second FRV factors, first and second rate constraints to be applied respectively to the first and second flows so that the sum of the reduced bandwidths is equal to the total available bandwidth.

21. The system according to claim 20, wherein the rate constraint enforcer is arranged to reduce the first and second required bandwidths by a system of a reduction factor and respective first and second bandwidth reduction units, which are determined by the respective first and second FRV factors.

* * * * *